(No Model.) 2 Sheets—Sheet 1.
F. PRINZ.
SHAKING SCREEN.
No. 418,588. Patented Dec. 31, 1889.
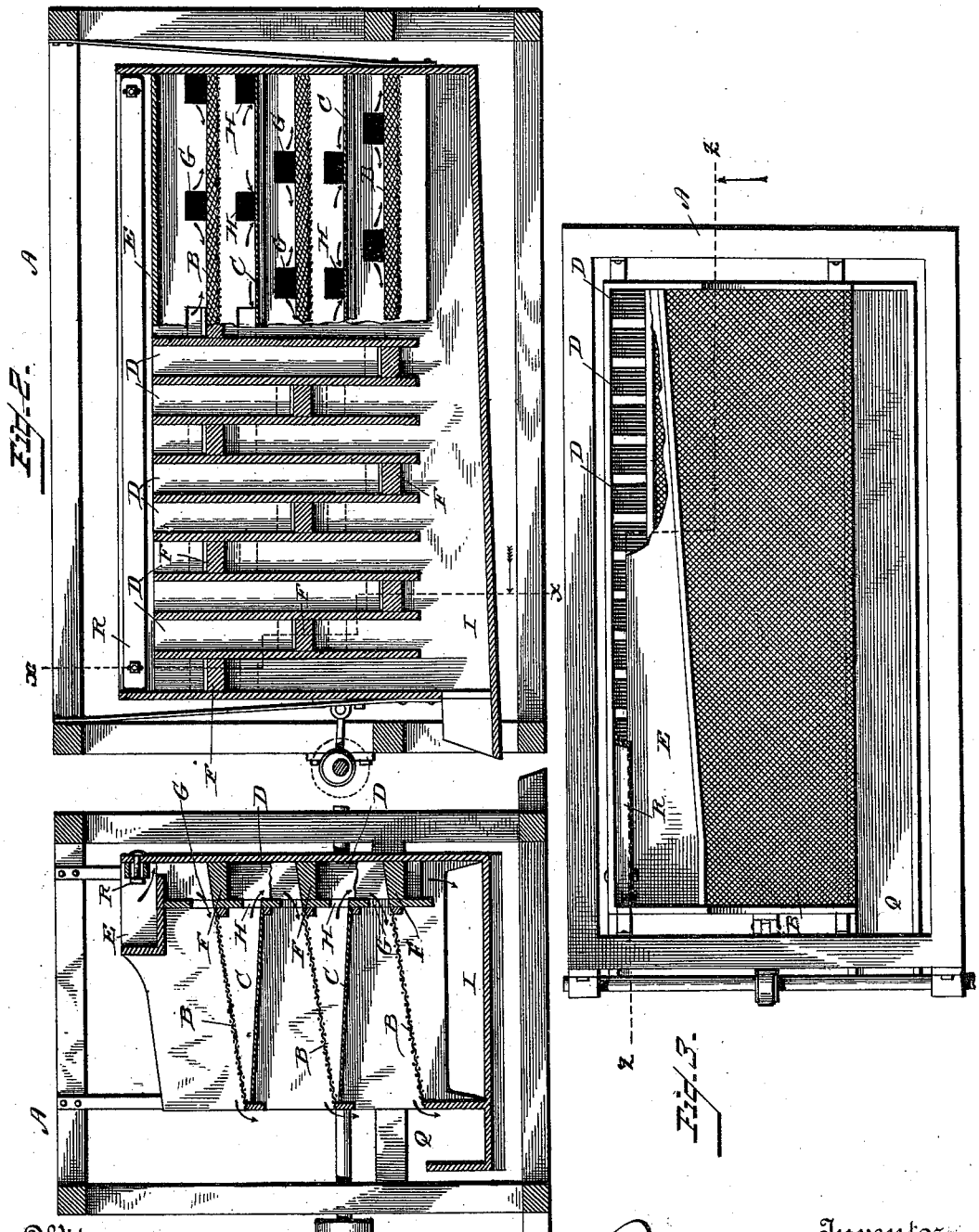

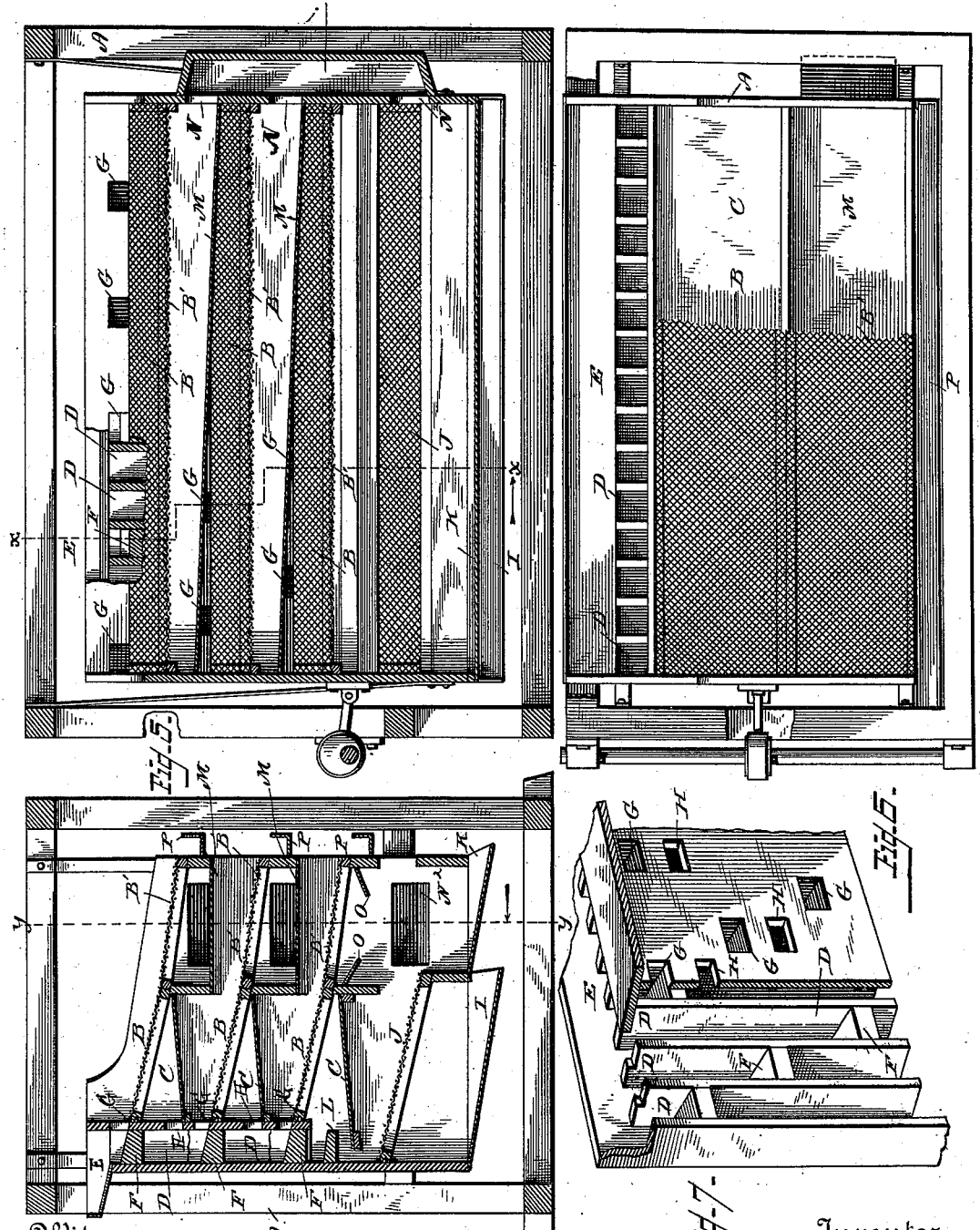

UNITED STATES PATENT OFFICE.

FAUSTIN PRINZ, OF MILWAUKEE, WISCONSIN.

SHAKING SCREEN.

SPECIFICATION forming part of Letters Patent No. 418,588, dated December 31, 1889.

Application filed November 25, 1887. Serial No. 256,137. (No model.)

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Shaking Screens; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to screens for cleaning or separating grain, more particularly to shaking screens, and has for its object, primarily, to produce a screen in which the material will be fed directly onto separate screens for its first separation, instead of onto one screen, from which it would pass to the other screens, as heretofore practiced.

Other objects may appear from the description hereinafter given.

Where all the material is fed onto one screen, from which it passes to a succession of other screens, the first screen, because of the quantity of material passed onto it, is not capable of discharging its function to its fullest capacity, and the same is true of the succeeding screens to a greater or less extent, and as a consequence the separation is not as thorough and satisfactory as it might be. With the view of rendering each screen capable of separating the material to its fullest capacity, and thus not only effect a more satisfactory separation of the material, but also to expedite its separation, I propose to construct the machine so that only a portion of the material will be fed onto the first screen, while another portion will be fed onto a second screen, and so on with the succession of screens, the material which passes through each screen being delivered into a final-delivery trough or receptacle, which may be common to all the screens. Each sieve will thus discharge its function independently of the other screens, and the feed will be directly to the series of screens, instead of to a single sieve, and thus the material will be distributed throughout the sieves and a quicker and better separation secured. The parts may be arranged so that the material from the several screens, prior to discharging into the final-delivery trough or receptacle, will be fed onto a sieve interposed between the series of independent screens and the final-delivery trough or receptacle, so that a second separation of all the material passing through the several independent sieves will be effected. One or more of the series of independent sieves may be provided with a supplemental sieve designed to receive the seed or grain and straw or other material too large to pass through the first set of screens and to separate such material, the seed or grain and material of whatever kind passing through this second series of sieves passing to a final-delivery trough, from which it may pass to a cockle-machine. (Not shown because not claimed herein.) The supplemental sieves may each be provided with a trough to receive the material passing from off and not through the sieves to deliver the same at a final-discharge point.

To the accomplishment of the several objects enumerated, a construction of machine suitable therefor will be hereinafter particularly described, and the invention specifically defined by the claims, reference being had to the accompanying drawings, forming a part hereof.

Figure 1 is a vertical cross-section through the shaker on the line $x\ x$ of Fig. 2; Fig. 2, a vertical longitudinal section on the line $z\ z$ of Fig. 3; Fig. 3, a plan with a portion broken away. Fig. 4 is a vertical cross-section of the preferred form of shaker; Fig. 5, a vertical longitudinal section on line $y\ y$ of Fig. 4; Fig. 6, a plan of the preferred form, with a portion of the sieve broken away; Fig. 7, a perspective of the feed-channels with parts broken away.

In the drawings, the letter A designates the frame of a shaker, which may be supported from a frame-work by straps in any of the well-known ways, and therefore not shown and described in detail. Within the shaker-frame there is supported by any suitable means a series of sieves B, of which three are shown arranged one above the other, and below each sieve except the lowest is a board or plate C, which inclines backwardly and downwardly toward the feed end of the sieve. At the feed or upper end of the sieves are a series of channels or flues D, opening at their upper ends into a feed-trough E, and extending downwardly to the point where they are intended to make their final discharge. These flues or channels are provided with openings which communicate some with one sieve and others with another sieve, and so on until all the sieves have some of the flues or channels communicating with them. The flues or channels are divided by blocks or partitions F into sections, so that one section will communicate through the aperture or opening G with the upper surface of the sieve, and the other or lower section with the top of the board C through an aperture or opening H, and also at its lower end with the discharge-chute. Any desired number of the flues may be made to communicate with any one sieve, and the partitions will be placed at such points that they will be in the respective flues immediately below the aperture opening onto the particular sieve. It will thus be seen that the material from the feed-trough E will be distributed at the same time onto several distinct sieves, and that the matter from one sieve does not pass onto the other, but that each sieve discharges its function independently of the other, and the material passing through it falls onto its board or plate and passes from thence back into the flue instead of down onto the next lower sieve, and passes out of the flue either into the delivery-receptacle I, as shown in Fig. 7, or otherwise.

Instead of having the wheat or other grain or seed pass directly into the delivery-receptacle, it may first be caused to pass onto a secondary separating-sieve, so as to cause a second separation before it passes off. For instance, the several flues may be made to open onto the last board or plate C of the series, so as to discharge thereon, and from there the product of the series of sieves will be discharged onto the secondary screen J, where the second separation will take place, the smaller grain passing through the sieve J into the trough or delivery-receptacle I, while the material not passing through the sieve will run off into the trough K. To insure the grain from the flues or channels falling onto the last board or plate C, a ledge or deflector L may be suitably supported so as to stand over the space or opening through which the material passes from the last plate down onto the secondary screen, as shown in Fig. 4. If desired, there may be a series of sieves J used one below the other, depending on the extent to which the grading is to be carried; but only one is shown.

In order to separate oats from wheat and straw or any material larger or longer than the grain to be cleaned, I place at the lower ends of the sieves B supplemental sieves B', onto which the material passes from the sieve B. The material which drops through the supplemental sieves B' falls onto a board or plate or into a trough M below the sieve, and passes off at the end thereof through openings N into flue $N^3$ and down into the lowermost trough K through the opening $N^2$, and from that trough the coarser material is run off at one end, while the small grain will go to a cockle-machine. (Not shown.) It will be noticed that each trough or plate M prevents the material which falls through the sieve next above from dropping down onto the sieve next below, so that, as in the case of the sieves B, the material from one sieve will not fall down onto the next, but each be kept separate and to itself.

Instead of using a close or solid board or plate under the lowermost of the sieves B', I may use two inclined plates O to direct the material into the trough K.

For the purpose of conducting off the material which passes off the sieves B', instead of passing through them, I arrange along the front edge of each sieve a trough P, which will conduct the material to the end of the shaker, where it will discharge.

The secondary sieve J and the supplemental sieves B' may be omitted, and the material not passing through the sieves B permitted to fall from the ends of the sieves into the trough Q, as shown in Fig. 7.

In Fig. 6 the material runs into the feed-trough throughout its entire length; but in Fig. 3 it runs into the trough at one end and feeds toward the other end. It is distributed, however, throughout the length of the trough, so as to feed to all the flues or channels, and in order that it may run into the flues or channels in about equal proportions the feed-trough is made to contract or narrow in width toward the tail or lower end, so that the material will be thicker or more compact at that end than at the upper or receiving end, where it will spread out more, and hence not feed to the flues or channels any faster than at the lower end.

In order to regulate the feed through the slot or mouth of the feed-trough opening into the flues or channels, I employ an adjustable slide or valve R, which, when raised, permits more material to flow into the flues or channels than when lowered. Such valve, however, may be omitted, as in Fig. 4.

Any suitable arrangement of shafts and eccentrics may be used to vibrate the shaker.

I have described with particularity the details of construction of the several parts entering into the construction of the shaker; but I do not mean to confine myself to details, as it is apparent that changes can be made without departing from my invention.

Having described my invention and set forth its merits what I claim is—

1. In a grain-separator, the combination of a series of sieves arranged one above the other, a series of channels, some of which communicate with one sieve and others with another sieve to form a separate feed to each of the several sieves, and means for reciprocating said sieves and channels, substantially as described.

2. In a grain-separator, the combination of a series of sieves arranged one above the other, and a separate horizontal series of flues or channels for each sieve communicating therewith, the flues or channels of one sieve alternating with those of another sieve to feed material onto each sieve at different points throughout the breadth of the sieve, substantially as described.

3. In a grain-separator, the combination of a series of sieves arranged one above the other, flues or channels communicating at the same ends of the sieves with the spaces above and also with the spaces below the sieves for feeding material to the sieves and receiving material from them, and means for delivering the material from the sieves into the openings below the same, substantially as described.

4. In a grain-separator, the combination of a series of sieves arranged one above the other, flues or channels divided in their length and communicating with the spaces above and also below the sieves for feeding material onto the sieves and receiving material from them, and boards or plates below the sieves for directing material back into the flues below the sieves, substantially as described.

5. In a grain-separator, the combination of a series of sieves arranged one above the other, flues or channels divided in their length and communicating with the space above and below the sieves for feeding material onto the sieves and receiving material from them, whereby is effected a separate feed and delivery to and from each sieve, and a secondary sieve below the series of sieves with which said flues communicate to deliver thereto the material of the several sieves, substantially as described.

6. In a grain-separator, the combination of a series of sieves arranged one above the other, flues or channels divided in their length and communicating with the spaces above and below the sieves for feeding material onto the sieves and receiving material from them, whereby is effected a separate feed and delivery to and from each sieve, a secondary sieve below the series of sieves, a plate between said secondary sieve and the sieve above it, inclined toward the receiving end of said secondary sieve to receive the material from the series of flues and deliver it to the receiving end of said secondary sieve, substantially as described.

7. In a grain-separator, the combination of a series of sieves arranged one above the other, means for effecting a separate feed and delivery to and from each of the several sieves, supplemental sieves at the lower ends of said series of sieves to receive material therefrom, and plates or troughs under said supplemental sieves to receive material passing through the sieves and prevent it from dropping down onto the next lower sieve, substantially as and for the purposes described.

8. In a grain-separator, the combination of a series of sieves arranged one above the other, means for effecting a separate feed and delivery to and from each of the several seives, supplemental sieves at the lower ends of said series of sieves to receive material passing from off their lower ends, plates or troughs under said supplemental sieves to prevent the material passing through one of said sieves from dropping down onto the next lower sieve, a trough to receive the material passing through the series of supplemental sieves, and a flue communicating with the spaces above said plates and with said trough to conduct material to said trough from said plates, substantially as described.

9. In a grain-separator, the combination, with a series of sieves arranged one above the other, of a separate horizontal series of flues or channels delivering to each sieve, the flues or channels of one sieve alternating with those of another sieve, and a feed-trough at the upper ends of said flues or channels narrowing from one part toward another of its length, substantially as described.

10. In a grain-separator, the combination, with the sieves and a feed-trough narrowing from one part toward another of its length, and having an elongated opening for the passage of the grain, of a valve for regulating the feed located over said opening and vertically adjustable, substantially as and for the purpose set forth.

11. In a grain-separator, the combination, with a series of sieves arranged one above the other, of flues or channels divided in their length and communicating with the spaces above and below the sieves for feeding material to said sieves and receiving material therefrom, means for directing material back to said flues, and a feed-trough communicating with said flues or channels and provided with a valve to regulate the feed thereto, substantially as described.

In testimony whereof I affix my signature in presence of two witnesses.

FAUSTIN PRINZ.

Witnesses:
JOHN M. CONNOLLY,
GEORGE J. SERY.